United States Patent
Hirabayashi

(10) Patent No.: US 11,615,916 B2
(45) Date of Patent: Mar. 28, 2023

(54) POWER SUPPLY APPARATUS AND IMAGE FORMING APPARATUS

(71) Applicant: CANON KABUSHIKI KAISHA, Tokyo (JP)

(72) Inventor: Jun Hirabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/520,533

(22) Filed: Nov. 5, 2021

(65) Prior Publication Data
US 2022/0165489 A1    May 26, 2022

(30) Foreign Application Priority Data

Nov. 20, 2020   (JP) ................ JP2020-193672

(51) Int. Cl.
| | |
|---|---|
| H01F 27/08 | (2006.01) |
| G03G 15/00 | (2006.01) |
| G03G 21/00 | (2006.01) |
| H01F 27/40 | (2006.01) |
| H01F 27/28 | (2006.01) |
| G03G 21/20 | (2006.01) |
| H01F 27/02 | (2006.01) |

(52) U.S. Cl.
CPC .......... *H01F 27/40* (2013.01); *G03G 15/80* (2013.01); *G03G 21/20* (2013.01); *H01F 27/02* (2013.01); *H01F 27/08* (2013.01); *H01F 27/28* (2013.01)

(58) Field of Classification Search
CPC ........ G03G 15/80; G03G 21/20; H01F 27/02; H01F 27/08; H01F 27/28; H01F 27/40; H02M 3/003; H02M 3/33507
See application file for complete search history.

(56) References Cited

U.S. PATENT DOCUMENTS

2019/0392993 A1*  12/2019  Sato .................. H01G 2/04

FOREIGN PATENT DOCUMENTS

| JP | 2004281652 A | * 10/2004 |
|---|---|---|
| JP | 2009182098 A | 8/2009 |
| JP | 2017170831 A | 9/2017 |
| JP | 2019149873 A | 9/2019 |
| JP | 6598511 B2 | 10/2019 |

* cited by examiner

*Primary Examiner* — Sophia S Chen
(74) *Attorney, Agent, or Firm* — Canon U.S.A., Inc. I.P. Division

(57) ABSTRACT

A power supply apparatus includes a transformer, an electrolytic capacitor provided in primary circuitry of the transformer, a board, and a heat sink having a protruding portion and a cover portion. The electrolytic capacitor includes an explosion-proof valve that opens to cause an electrolytic solution to be jetted from the electrolytic capacitor. The electrolytic capacitor is placed on the board so that a surface of the electrolytic capacitor opposite to a surface on which the explosion-proof valve is provided faces the board. The cover portion has a hole formed in the cover portion and, when the cover portion is viewed in a direction vertical to the surface of the electrolytic capacitor on which the explosion-proof valve is provided, at least the explosion-proof valve and the hole formed in the cover portion do not overlap each other and the cover portion encompasses the explosion-proof valve.

13 Claims, 8 Drawing Sheets

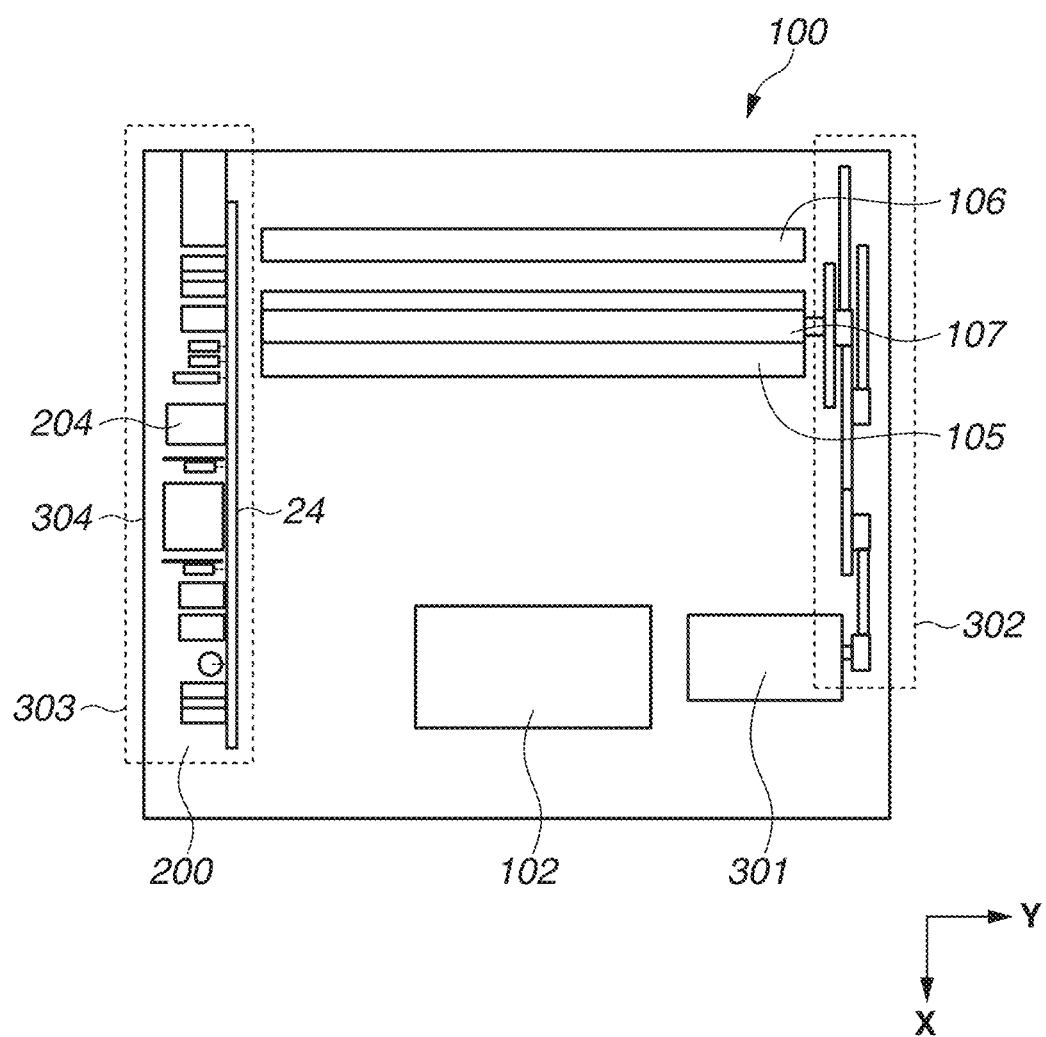

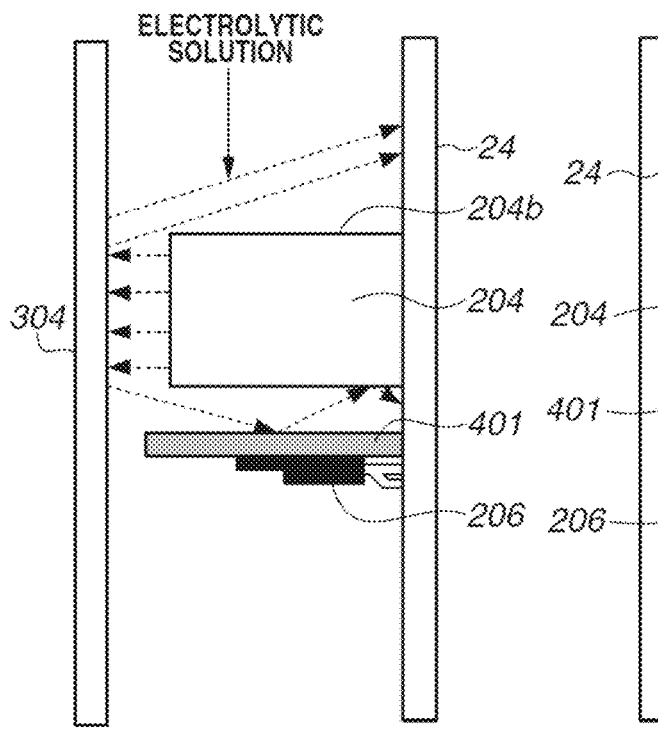
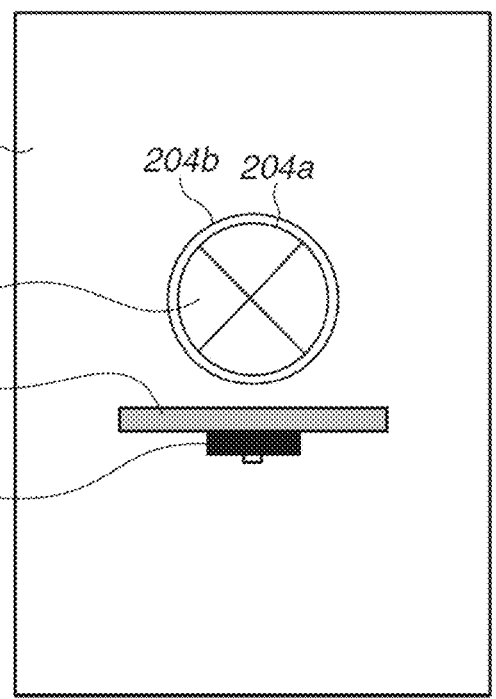
FIG.4A Related Art
FIG.4B Related Art

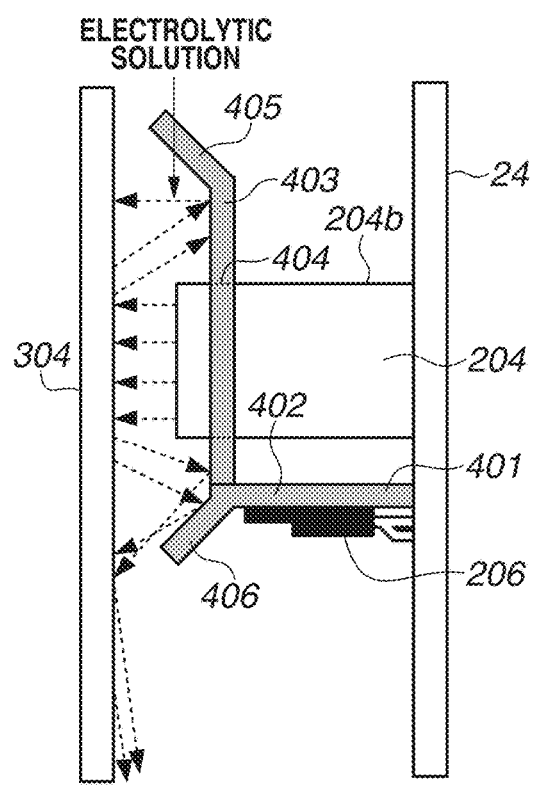
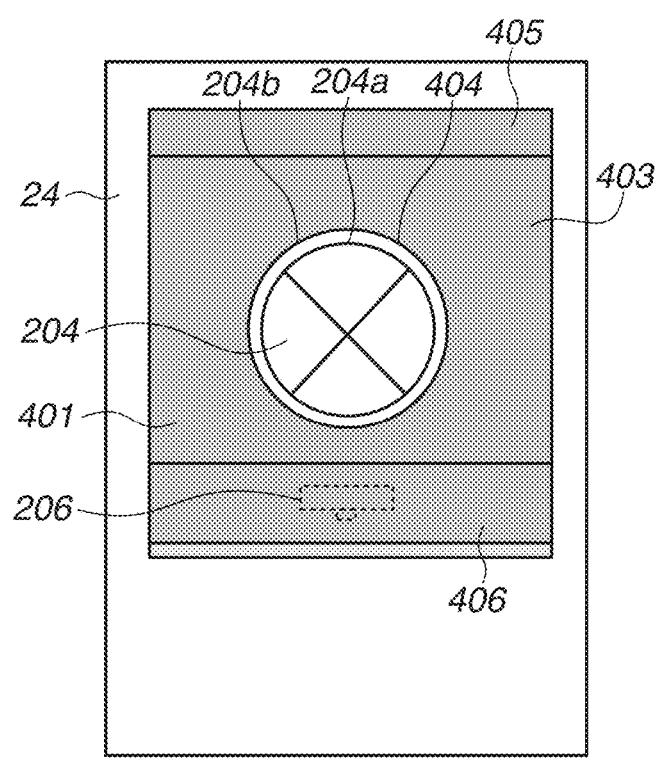
FIG.7A
FIG.7B

POWER SUPPLY APPARATUS AND IMAGE FORMING APPARATUS

BACKGROUND

Field

The present disclosure relates to a power supply apparatus including an electrolytic capacitor having an explosion-proof valve, and an image forming apparatus including the power supply apparatus.

Description of the Related Art

Conventional image forming apparatuses such as laser printers use a power supply apparatus that rectifies and smooths an alternating current from a commercial power source and converts the current into a direct current. In a switching power supply apparatus that is a kind of direct current power supply apparatus, a rectified and smoothed direct current is input into a transformer and switched to obtain a desired output. Examples of the switching power supply apparatus include those using methods such as a flyback method, a forward method, and a current resonance method. These switching power supply apparatuses include a rectifier circuit that rectifies an input alternating current, and a smoothing circuit that smooths the rectified current.

The smoothing circuit uses an electrolytic capacitor to obtain a large capacitance in some cases. When an excessive voltage is applied to the electrolytic capacitor, a gas is generated in the capacitor. To prevent a pressure rise in the capacitor due to the gas, the electrolytic capacitor has an incision called an explosion-proof valve. When the explosion-proof valve is actuated, a conductive electrolytic solution is jetted out of the capacitor to the outside. If the jetted electrolytic solution adheres to the peripheral circuitry, the circuitry may be affected by the electrolytic solution. More specifically, the adherence of the electrolytic solution to the primary circuitry may cause a short circuit, resulting in flow of a large current.

To address this issue, Japanese Patent No. 6598511 discusses a configuration in which a deflection plate is provided at a position facing the explosion-proof valve of the electrolytic capacitor in order to guide the electrolytic solution jetted out of the opened explosion-proof valve to the area of the circuitry that is unaffected by the adherence of the electrolytic solution. More specifically, in the configuration, the jetted electrolytic solution is guided by the deflection plate to the secondary circuitry without adhering to the primary circuitry.

In recent years, with the downsizing of printers, the distance between the exterior surface and circuit board of a printer has become shorter than before. As a result, the space for providing the deflection plate discussed in Japanese Patent No. 6598511 cannot be secured, and the jetted electrolytic solution may be reflected on the exterior and adhere to the circuitry. In addition, even if the deflection plate is provided, it is not possible to keep a sufficient distance between the deflection plate and the electrolytic capacitor, and a part of the jetted electrolytic solution may adhere to an area where the circuit functionality can be affected by the adherence.

SUMMARY

The present disclosure is directed to suppressing an electrolytic solution jetted out of an electrolytic capacitor from adhering to circuitry while achieving downsizing of an image forming apparatus.

According to an aspect of the present disclosure, a power supply apparatus includes a transformer including a primary coil and a secondary coil and configured to output a voltage to the secondary coil based on a voltage input to the primary coil, an electrolytic capacitor provided in primary circuitry of the transformer and including an explosion-proof valve configured to, in a case where a voltage equal to or greater than a predetermined value is applied to the electrolytic capacitor, open to cause an electrolytic solution to be jetted from an inside of the electrolytic capacitor to an outside of the electrolytic capacitor, a heat sink configured to dissipate heat from the power supply apparatus, and a board on which the electrolytic capacitor and the heat sink are placed, wherein the electrolytic capacitor is placed on the board so that a surface of the electrolytic capacitor opposite to a surface on which the explosion-proof valve is provided faces the board, wherein the heat sink includes a protruding portion that extends in a protruding direction with respect to a surface of the board and a cover portion that extends from a part of the protruding portion along the surface of the board in a state of being separated from the board, and wherein the cover portion has a hole formed in the cover portion and, when the cover portion is viewed in a direction vertical to the surface of the electrolytic capacitor on which the explosion-proof valve is provided, at least the explosion-proof valve and the hole formed in the cover portion do not overlap each other and the cover portion encompasses the explosion-proof valve.

Further features of the present disclosure will become apparent from the following description of exemplary embodiments with reference to the attached drawings.

BRIEF DESCRIPTION OF THE DRAWINGS

FIG. 3 is a top view of the image forming apparatus.

FIGS. 4A and 4B are views illustrating a configuration according to a comparative example.

FIGS. 7A and 7B are views illustrating a configuration according to a modification example 2.

DESCRIPTION OF THE EMBODIMENTS

[Configuration of Image Forming Apparatus]

A configuration of an image forming apparatus 100 according to an exemplary embodiment of the present disclosure will be described. The image forming apparatus 100 according to the present exemplary embodiment is a monochrome laser printer using an electrophotographic process, and is configured to form an image on paper P as a recording material by using toner (developer), based on image information transmitted from an external apparatus such as a personal computer.

In the following description, a height direction (opposite to a gravity direction) of the image forming apparatus 100 placed on a horizontal surface will be referred to as a Z direction. A direction crossing the Z direction and parallel to an axial direction (a main scanning direction) of a photosensitive drum 105 to be described below will be referred to as a Y direction. A direction crossing the Y direction and the Z direction will be referred to as an X direction. It is desirable that the X direction, the Y direction, and the Z direction vertically cross each other. For the sake of convenience, the positive side of the X direction will be referred to as the front side, and the negative side of the X direction will be referred to as the back side or the rear side. The positive side of the Y direction will be referred to as the right side, and the negative side of the Y direction will be referred to as the left side. The positive side of the Z direction will be referred to as the upper side, and the negative side of the Z direction will be referred to as the lower side.

Figure 1:
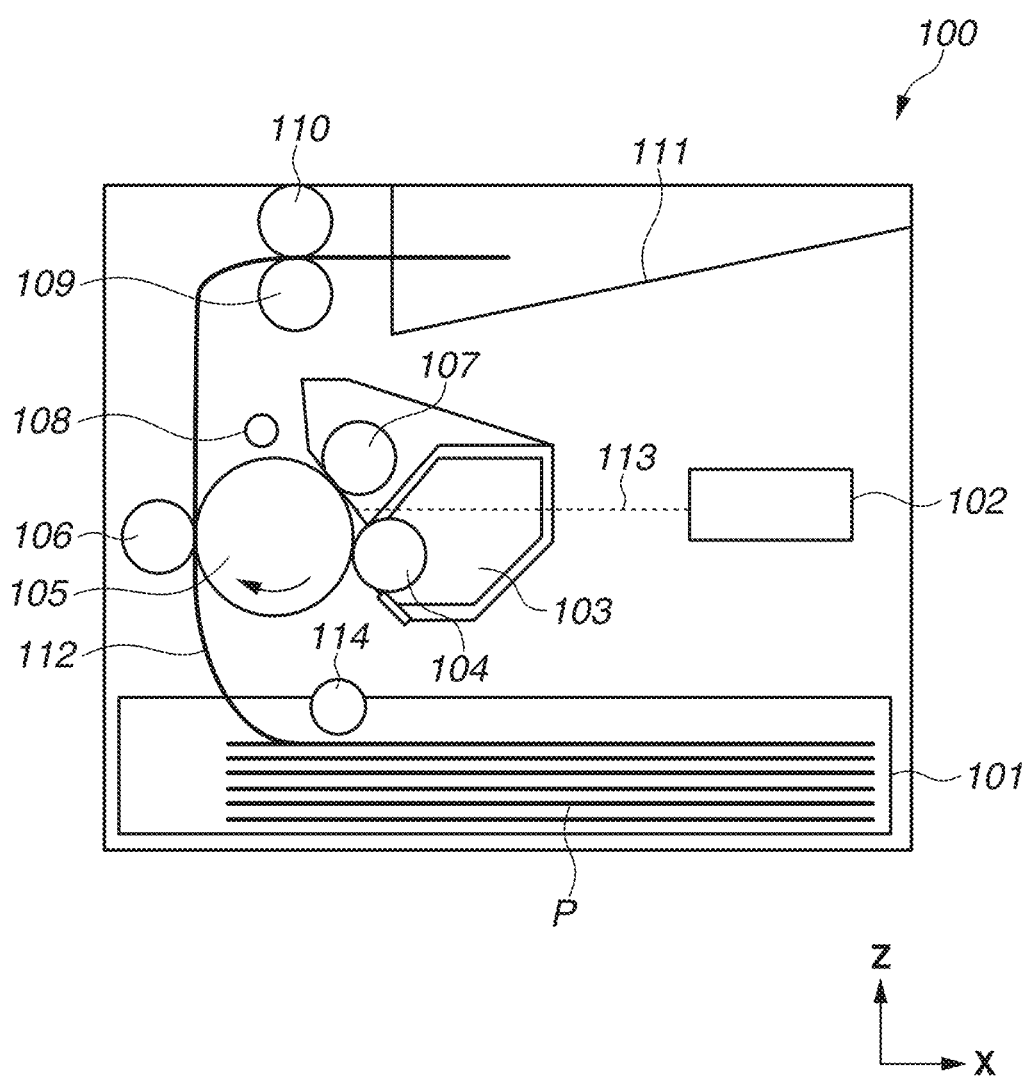
FIG. 1 is a cross-sectional view of an image forming apparatus.

FIG. 1 is a cross-sectional view of the image forming apparatus 100. Referring to FIG. 1, a paper feed unit 101 stores paper P as a print medium, and the paper P is stacked therein. The image forming apparatus 100 also includes a laser scanner 102 and a toner tank 103 that contains magnetic toner. The image forming apparatus 100 further includes a development roller 104, the photosensitive drum 105, a transfer roller 106, a charge roller 107, a light guide 108 for pre-exposure, a fixing roller 109, and a pressure roller 110. A paper discharge unit 111, a conveyance path 112 for the paper P, laser light 113 emitted from the laser scanner 102, and a paper feed roller 114 are also included in the image forming apparatus 100. The light guide 108 extends in the longitudinal direction (the axial direction) of the photosensitive drum 105 and has a groove formed therein. The light guide 108 uses the formed groove to gradually reflect light emitted from a light-emitting diode (LED) for pre-exposure (not illustrated) at one end in the longitudinal direction, from the light incidence part to the most distal part. Accordingly, the light from the LED for pre-exposure is uniformly applied to the entire longitudinal area of the photosensitive drum 105.

[Operation of Image Forming Apparatus]

Operation of the image forming apparatus 100 will be described. First, upon receipt of a print job, rollers (described below) and the laser scanner 102 start operation. The photosensitive drum 105 starts to rotate in a direction indicated by an arrow in FIG. 1. The charge roller 107 receives power from a power supply apparatus 200 to be described below (see FIG. 2) to generate a high negative voltage and electrically charges the surface of the photosensitive drum 105. When an image signal is transmitted from the external apparatus, the laser scanner 102 scans the photosensitive drum 105 with a laser blinking based on pixels of the image signal. The electric charge disappears from the area, on the surface of the electrically charged photosensitive drum 105, to which the laser light 113 is applied, so that an electrostatic latent image is formed on the photosensitive drum 105.

The development roller 104 is supplied with a high negative voltage and has a magnet inside. The development roller 104 attracts the magnetic toner in the toner tank 103 by magnetic power, and develops the electrostatic latent image on the photosensitive drum 105 by using the toner. Meanwhile, the paper P fed from the paper feed unit 101 by the paper feed roller 114 passes through the conveyance path 112 and is conveyed to a transfer nip portion formed by the transfer roller 106 and the photosensitive drum 105. At this time, a high positive voltage has been applied to the transfer roller 106, and the toner image formed on the photosensitive drum 105 is attracted and transferred to the paper P by the transfer roller 106.

The paper P with the toner image transferred thereon is conveyed toward the paper discharge unit 111 and conveyed to a fixing nip portion formed by the fixing roller 109 and the pressure roller 110. At the fixing nip portion, the paper P is heated to several hundred degrees by the fixing roller 109 and is pressed by the pressure roller 110 at the same time, so that the toner image transferred on the paper P by electrostatic force is fixed to the paper P. The paper P with the toner image fixed thereon is discharged to the paper discharge unit 111 and is sequentially stacked thereon.

Meanwhile, the surface potential of the photosensitive drum 105 after the transfer is in a nonuniform state due to the image. As described above, the light guide 108 guides the light emitted from the LED for pre-exposure in the longitudinal direction and uniformly neutralizes the surface potential of the photosensitive drum 105 to near 0 V, so that the previous image does not affect the next image. By repeating the above-described operation, the image forming apparatus 100 forms images on the paper P.

[Circuit Configuration of Power Source Apparatus]

Figure 2:
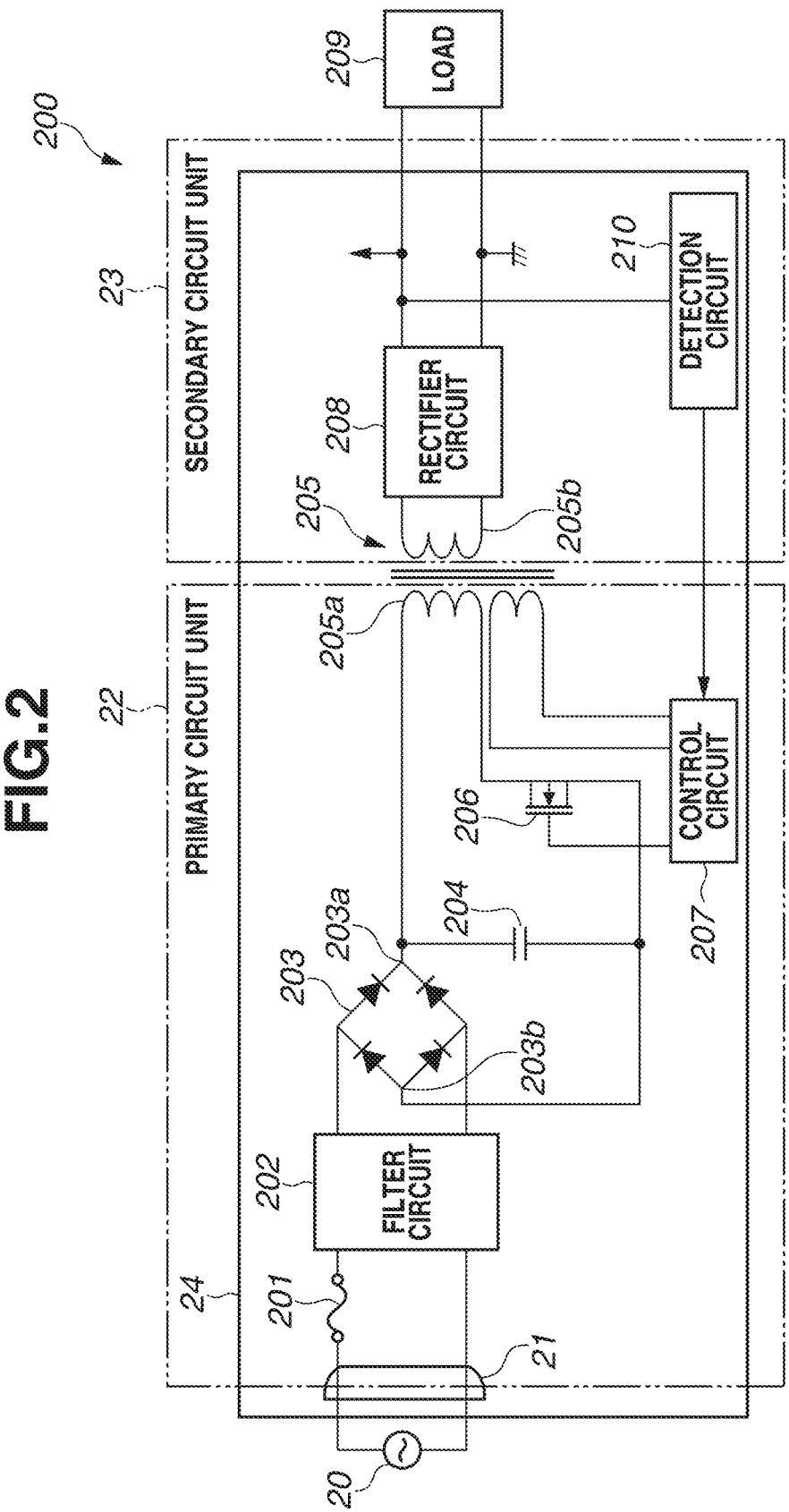
FIG. 2 is a circuit configuration diagram of a power supply apparatus.

FIG. 2 is a circuit configuration diagram of the power supply apparatus 200 mounted in the image forming apparatus 100. As described above, various voltages are used in the operation process of the image forming apparatus 100. The power supply apparatus 200 converts an alternating current supplied from an external power source into a direct current and outputs the various voltages. As illustrated in FIG. 2, the power supply apparatus 200 includes a circuit unit (a primary circuitry unit) 22 and a circuit unit (a secondary circuit unit) 23. The circuit units 22 and 23 are formed of one printed board 24. Alternatively, the circuit units 22 and 23 may be formed of a plurality of parts into which a printed board is divided.

The circuit unit 22 includes an inlet 21, a fuse 201, a filter circuit 202, a rectifier circuit (a primary rectifier circuit) 203, an electrolytic capacitor 204, a switching element (a switching field-effect transistor (FET)) 206, and a control circuit 207. The circuit unit 23 includes a rectifier circuit (a secondary rectifier circuit) 208 and a detection circuit 210. The power supply apparatus 200 also includes a transformer 205. While a primary coil 205a of the transformer 205 belongs to the circuit unit 22 and a secondary coil 205b of the transformer 205 belongs to the circuit unit 23, the transformer 205 as a whole element is included in the circuit unit 22.

A commercial alternating current power source 20 is connected to the power supply apparatus 200 and supplies electric power to the power supply apparatus 200 via the inlet 21. The electric power supplied to the power supply apparatus 200 reaches the rectifier circuit 203 through the fuse 201 and the filter circuit 202. The rectifier circuit 203 is a diode bridge circuit formed of four diodes, for example. The alternating current with a sinusoidal waveform input from the commercial alternating current power source 20 is rectified to a current with a pulsing waveform by the rectifier circuit 203. The input current with the pulsing waveform is smoothed by the electrolytic capacitor 204. In other words, the electrolytic capacitor 204 according to the present exemplary embodiment functions as a primary smoothing capacitor.

The value of the smoothed input voltage is close to a peak value in the sinusoidal waveform of the input alternating current voltage. The smoothed input voltage is input from a plus terminal 203a to the transformer 205, and the current is fed back to a minus terminal 203b via the switching element 206. The on/off timing of the switching element 206 is controlled by the control circuit 207. The power supplied to the control circuit 207 is generated by the transformer 205.

The rectifier circuit 208 is connected to the secondary coil 205b of the transformer 205. The power subjected to voltage conversion by the transformer 205 reaches the rectifier circuit 208, is rectified and smoothed to a predetermined voltage value by the rectifier circuit 208, and is output to a load 209 at an outside of the power supply apparatus 200. An output-side terminal of the rectifier circuit 208 is connected to the detection circuit 210, so that the output voltage value of the rectifier circuit 208 is also input to the detection circuit 210. The detected value of the detection circuit 210 (the output voltage value of the rectifier circuit 208) is input to the control circuit 207. In order to ensure insulation between the detection circuit 210 side (the secondary circuit unit 23 side) and the control circuit 207 side (the primary circuit unit 22 side), the detection circuit 210 and the control circuit 207 are connected together via an insulating element such as a photo coupler. Based on the detected value input from the detection circuit 210 to the control circuit 207, the control circuit 207 determines the on/off timing of the switching element 206.

[Arrangement Configuration of Power Supply Apparatus]

FIG. 3 is a top view of the image forming apparatus 100. As illustrated in FIG. 3, the power supply apparatus 200 described above with reference to FIG. 2 is arranged in the image forming apparatus 100 so that the surface of the printed board 24 is substantially parallel to an XZ plane. In other words, the printed board 24 is arranged to be substantially vertical to the horizontal surface.

A main motor 301 is a motive power source for driving the rollers of the main body of the image forming apparatus 100. An area 302 indicated by a dashed line represents a gear box that transfers a rotary force of the main motor 301. An area 303 indicated by a dashed line includes the power supply apparatus 200, a control board that controls the entire operation of the image forming apparatus 100. FIG. 3 illustrates only the electrolytic capacitor 204 among a plurality of electronic components included in the power supply apparatus 200. As illustrated in FIG. 3, it can be seen that a distance between the electrolytic capacitor 204 and an exterior cover 304 in the Y direction is short.

[Configuration of Electrolytic Capacitor and Peripheral Area]

FIGS. 4A and 4B illustrate a configuration of the electrolytic capacitor 204 and an area around the electrolytic capacitor 204 according to a comparative example. FIG. 4A is a side view of the printed board 24 with the electrolytic capacitor 204 placed thereon. FIG. 4B is a view of the electrolytic capacitor 204 seen from a direction vertical to the surface of the printed board 24. A heat sink 401 is placed on the printed board 24 and dissipates heat from the circuitry. The switching element 206 is directly attached to the heat sink 401 and is in contact with the heat sink 401 because the switching element 206 is a component particularly prone to generate heat among the components on the circuitry.

As described in FIG. 4B, the electrolytic capacitor 204 includes an X-marked explosion-proof valve 204a, and is placed on the printed board 24 so that the surface of the electrolytic capacitor 204 opposite to the surface on which the explosion-proof valve 204a is provided faces the printed board 24. In the present exemplary embodiment, the electrolytic capacitor 204 is attached vertically to the printed board 24 so that the surface of the printed board 24 and the surface of the electrolytic capacitor 204 on which the explosion-proof valve 204a is provided are parallel to each other. An outer shape portion 204b of the electrolytic capacitor 204 is also illustrated in FIG. 4B.

If a voltage equal to or higher than a predetermined value exceeding a withstanding voltage is applied to the electrolytic capacitor 204, the explosion-proof valve 204a is opened to release the electrolytic solution to the outside to prevent an extreme voltage rise in the electrolytic capacitor 204. For example, if the image forming apparatus 100 manufactured for regions with a commercial frequency of 100 V is used in a region with a commercial frequency of 200 V, the explosion-proof valve 204a of the electrolytic capacitor 204 is to be opened. As a result of the opening of the explosion-proof valve 204a, in the configuration according to the comparative example, the electrolytic solution released from the electrolytic capacitor 204 bounces back inside the opposing exterior cover 304 and adheres to the printed board 24 and the other electronic components, as illustrated in FIG. 4A.

Figure 5A:
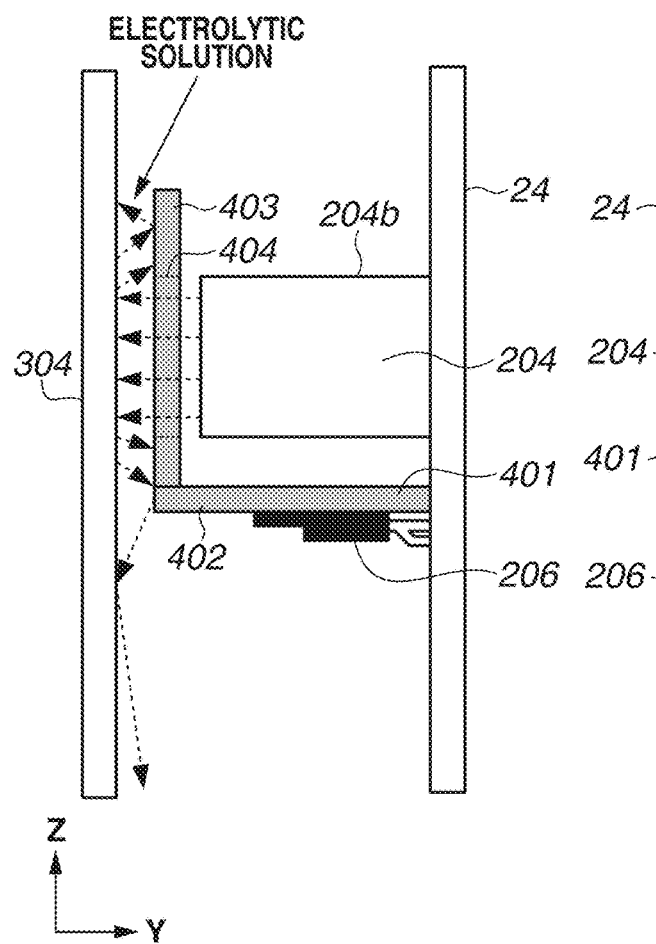
FIGS. 5A and 5B are views illustrating a configuration according to an exemplary embodiment.
Figure 5B:
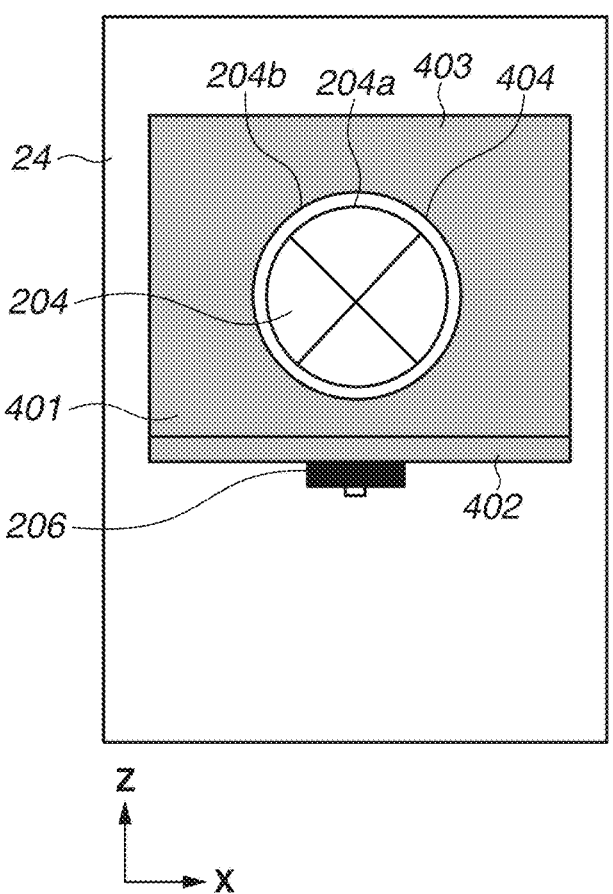

FIGS. 5A and 5B illustrates a configuration of the electrolytic capacitor 204 and an area around the electrolytic capacitor 204 according to the present exemplary embodiment. FIG. 5A is a view seen from the same direction as FIG. 4A. FIG. 5B is a view seen from the same direction as FIG. 4B. The configuration illustrated in FIGS. 5A and 5B is different from the configuration illustrated in FIGS. 4A and 4B in that the heat sink 401 has a different shape and an increased area.

As illustrated in FIG. 5A, the heat sink 401 includes a protruding portion 402 that protrudes in the minus Y-axis direction with respect to the surface of the printed board 24, and a cover portion 403 that extends from a part of the protruding portion 402 along the surface of the printed board 24 in a state of being separated from the printed board 24. While in the present exemplary embodiment, the protruding portion 402 and the cover portion 403 are formed by folding one member, the protruding portion 402 and the cover portion 403 may be formed by connecting separate members. The protruding portion 402 is larger in size than at least the switching element 206.

As illustrated in FIG. 5B, the cover portion 403 has a hole 404 of a size corresponding to the outer shape portion 204b of the electrolytic capacitor 204 (the diameter of the electrolytic capacitor 204). With this shape, the electrolytic solution released by the opening of the explosion-proof valve 204a passes through the hole 404 in the cover portion 403 and is reflected inside the exterior cover 304, but the reflected electrolytic solution is blocked by the cover portion 403. In other words, the electrolytic solution is prevented from adhering to the printed board 24 and the primary circuitry around the electrolytic capacitor 204.

In addition, as described above, the printed board 24 is arranged in a portrait orientation so as to be substantially parallel to the XZ plane, so that the doubly reflected electrolytic solution loses force and drops downward without adhering to the printed board 24. Furthermore, the increased area of the heat sink 401 makes it possible to obtain the side benefit of enhancing the heat dissipation effect on the switching element 206.

Since the surface of the electrolytic capacitor 204 on which the explosion-proof valve 204a is provided and the surface of the printed board 24 are parallel to each other, FIG. 5B can also be said to be a view seen from a direction vertical to the surface of the electrolytic capacitor 204 on which the explosion-proof valve 204a is provided. Referring to FIG. 5B, the hole 404 formed in the cover portion 403 and the explosion-proof valve 204a do not overlap each other and the cover portion 403 is arranged to encompass the explosion-proof valve 204a. With this configuration, it is possible to prevent the electrolytic solution from adhering to the printed board 24 and the primary circuitry around the electrolytic capacitor 204.

As described above, according to the present exemplary embodiment, it is possible to suppress the electrolytic solution jetted out of the electrolytic capacitor 204 from adhering to the circuitry while achieving the downsizing of the image forming apparatus 100.

In the above-described exemplary embodiment, the cover portion 403 is more separated from the printed board 24 than the end surface of the electrolytic capacitor 204 in the minus Y-axis direction. However, the configuration is not limited thereto. Alternatively, the cover portion 403 may be located closer to the printed board 24 than the end surface of the electrolytic capacitor 204 in the minus Y-axis direction.

Figure 6A:
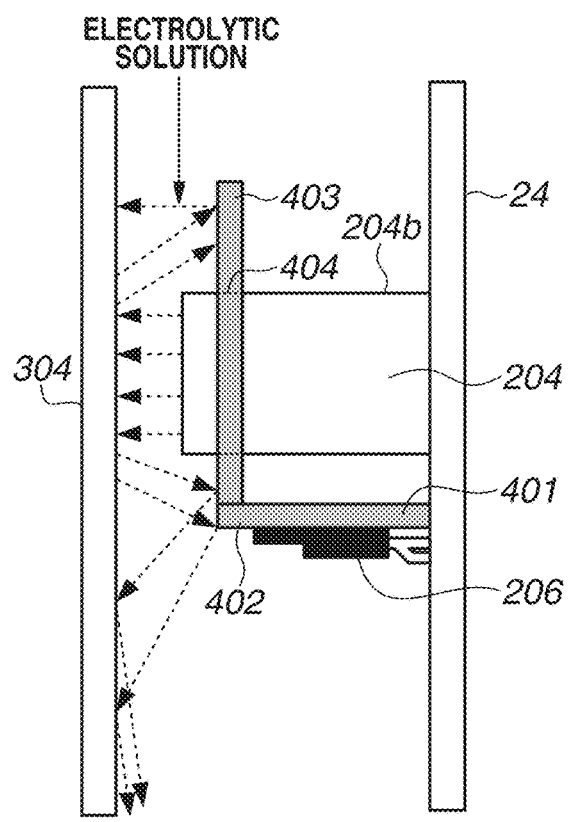
FIGS. 6A and 6B are views illustrating a configuration according to a modification example 1.
Figure 6B:
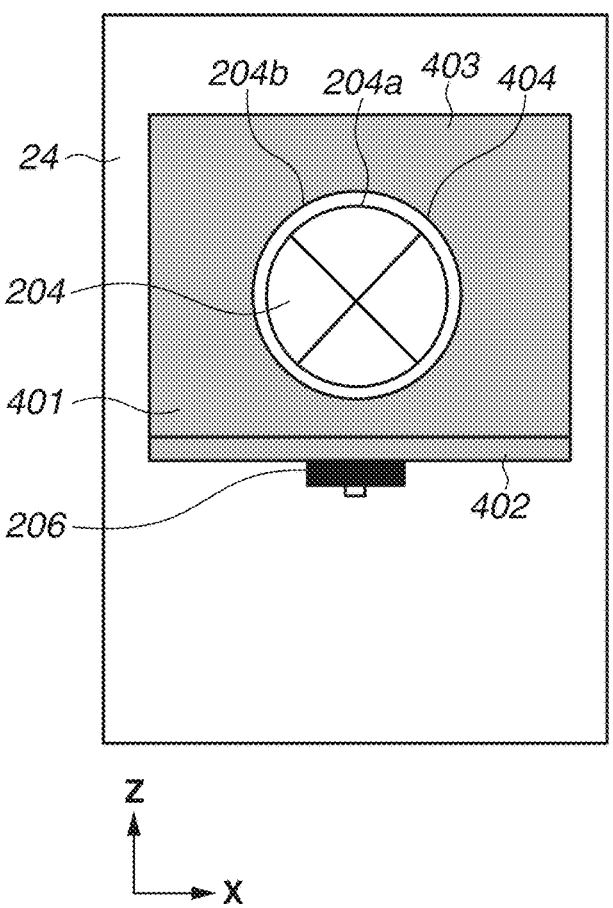

FIGS. 6A and 6B illustrate a configuration of the electrolytic capacitor 204 and an area around the electrolytic capacitor 204 according to a modification example 1. FIG. 6A is a view seen from the same direction as FIG. 4A. FIG. 6B is a view seen from the same direction as FIG. 4B. As illustrated in FIG. 6A, the height of the cover portion 403 of the heat sink 401 (the distance in the Y-axis direction) may not necessarily be larger than the height of the electrolytic capacitor 204. In this case, since the electrolytic capacitor 204 penetrates through the cover portion 403 of the heat sink 401, it is desirable that the hole 404 formed in the cover portion 403 be slightly larger than the diameter of the electrolytic capacitor 204.

While in the above-described exemplary embodiment, the electrolytic solution reflected from the exterior cover 304 is received by the cover portion 403, the configuration is not limited thereto. A member for the heat sink 401 may be added to the periphery of the cover portion 403 so that scattering of the electrolytic solution is controlled more extensively.

FIGS. 7A and 7B illustrate a configuration of the electrolytic capacitor 204 and an area around the electrolytic capacitor 204 according to a modification example 2. FIG. 7A is a view seen from the same direction as FIG. 4A, and FIG. 7B is a view seen from the same direction as FIG. 4B. In the present modification example, inwardly inclined portions 405 and 406 are added to the upper and lower sides of the cover portion 403 so as to guide the electrolytic solution to the cover portion 403.

While in the above-described exemplary embodiment, the hole 404 formed in the cover portion 403 has the size corresponding to the outer shape portion 204b of the electrolytic capacitor 204, the size is not limited thereto. The hole 404 may be larger or smaller in size than the outer shape portion 204b.

Figure 8A:
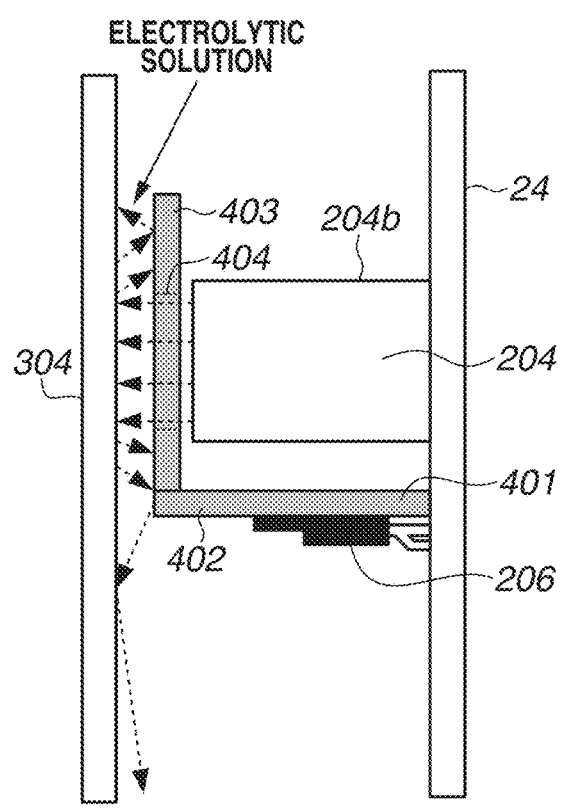
FIGS. 8A and 8B are views illustrating a configuration according to a modification example 3.
Figure 8B:
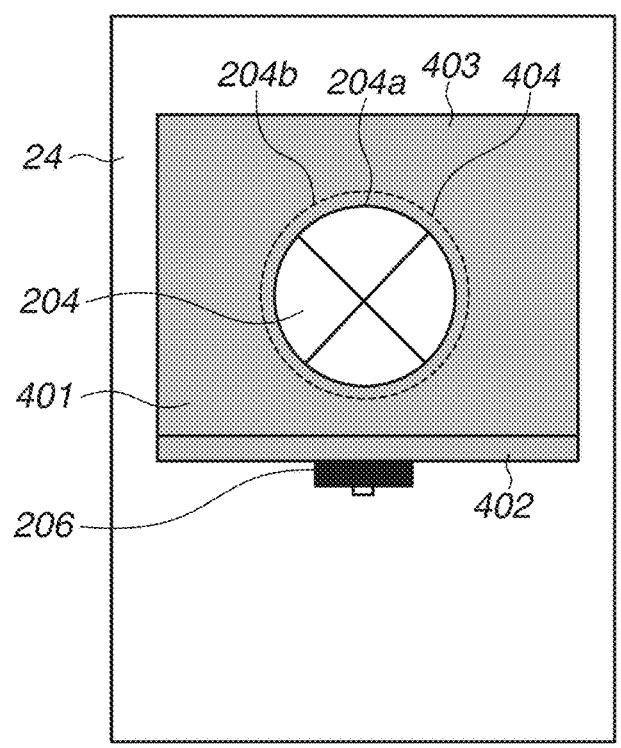

FIGS. 8A and 8B illustrate a configuration of the electrolytic capacitor 204 and an area around the electrolytic capacitor 204 according to a modification example 3. FIG. 8A is a view seen from the same direction as FIG. 4A, and FIG. 8B is a view seen from the same direction as FIG. 4B. As illustrated in FIG. 8B, the hole 404 according to the present modification example is smaller in size than the outer shape portion 204b of the electrolytic capacitor 204. The hole 404 may be smaller in size than the outer shape portion 204b of the electrolytic capacitor 204 as long as there is an opening hole on the route where the electrolytic solution is to be scattered when the explosion-proof valve 204a is opened.

In this manner, decreasing the size of the hole 404 compared to the configuration described above with reference to FIGS. 5A and 5B can increase the area of the heat sink 401 and enhance the heat dissipation effect on the switching element 206. However, covering up to the explosion-proof valve 204a by the cover portion 403 causes the electrolytic solution to bounce back inside the cover portion 403 and drop onto the printed board 24. It is thus desirable that the hole 404 in the cover portion 403 be larger in size than at least the explosion-proof valve 204a, more specifically, at least a label portion stuck to the surface of a general electrolytic capacitor.

While the above-described exemplary embodiment has been described taking the electrolytic capacitor 204 used as a primary smoothing capacitor as an example, the exemplary embodiment is not limited to this example. The technique according to the exemplary embodiment is not limited to primary smoothing capacitors for direct current smoothing but is applicable to all capacitors having explosion-proof valves.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-193672, filed Nov. 20, 2020, which is hereby incorporated by reference herein in its entirety.

What is claimed is:

1. A power supply apparatus comprising:
    a transformer including a primary coil and a secondary coil and configured to output a voltage to the secondary coil based on a voltage input to the primary coil;
    an electrolytic capacitor provided in primary circuitry of the transformer and including an explosion-proof valve configured to, in a case where a voltage equal to or greater than a predetermined value is applied to the electrolytic capacitor, open to cause an electrolytic solution to be jetted from an inside of the electrolytic capacitor to an outside of the electrolytic capacitor;
    a heat sink configured to dissipate heat from the power supply apparatus; and
    a board on which the electrolytic capacitor and the heat sink are placed,
    wherein the electrolytic capacitor is placed on the board so that a surface of the electrolytic capacitor opposite to a surface on which the explosion-proof valve is provided faces the board,
    wherein the heat sink includes a protruding portion that extends in a protruding direction with respect to a surface of the board and a cover portion that extends from a part of the protruding portion along the surface of the board in a state of being separated from the board, and
    wherein the cover portion has a hole formed in the cover portion and, when the cover portion is viewed in a direction vertical to the surface of the electrolytic capacitor on which the explosion-proof valve is provided, at least the explosion-proof valve and the hole formed in the cover portion do not overlap each other and the cover portion encompasses the explosion-proof valve.

2. The power supply apparatus according to claim 1, wherein the electrolytic capacitor is a primary smoothing capacitor used for smoothing a direct current and includes a switching element in contact with the heat sink and configured to switch whether to supply the direct current smoothed by the electrolytic capacitor to the primary coil.

3. The power supply apparatus according to claim 2, wherein the switching element is in contact with the protruding portion of the heat sink and the protruding portion is larger in size than at least the switching element.

4. The power supply apparatus according to claim 1, wherein the cover portion is more separated from the surface of the board than the surface of the electrolytic capacitor on which the explosion-proof valve is provided.

5. The power supply apparatus according to claim 1, wherein the cover portion is closer to the surface of the board than the surface of the electrolytic capacitor on which the explosion-proof valve is provided.

6. The power supply apparatus according to claim 1, wherein the heat sink further includes an inclined portion that is connected to a part of a perimeter of the cover portion and is inwardly inclined with respect to the cover portion.

7. An image forming apparatus comprising:
an image forming unit configured to form an image on a recording material;
a transformer including a primary coil and a secondary coil and configured to output a voltage to the secondary coil based on a voltage input to the primary coil;
an electrolytic capacitor provided in primary circuitry of the transformer and including an explosion-proof valve configured to, in a case where a voltage equal to or greater than a predetermined value is applied to the electrolytic capacitor, open to cause an electrolytic solution to be jetted from an inside of the electrolytic capacitor to an outside of the electrolytic capacitor;
a heat sink configured to dissipate heat from the image forming apparatus; and
a board on which the electrolytic capacitor and the heat sink are placed,
wherein the electrolytic capacitor is placed on the board so that a surface of the electrolytic capacitor opposite to a surface on which the explosion-proof valve is provided faces the board,
wherein the heat sink includes a protruding portion that extends in a protruding direction with respect to a surface of the board and a cover portion that extends from a part of the protruding portion along the surface of the board in a state of being separated from the board, and
wherein the cover portion has a hole formed in the cover portion and, when the cover portion is viewed in a direction vertical to the surface of the electrolytic capacitor on which the explosion-proof valve is provided, at least the explosion-proof valve and the hole formed in the cover portion do not overlap each other and the cover portion encompasses the explosion-proof valve.

8. The image forming apparatus according to claim 7, wherein the electrolytic capacitor is a primary smoothing capacitor used for smoothing a direct current and includes a switching element in contact with the heat sink and configured to switch whether to supply the direct current smoothed by the electrolytic capacitor to the primary coil.

9. The image forming apparatus according to claim 8, wherein the switching element is in contact with the protruding portion of the heat sink and the protruding portion is larger in size than at least the switching element.

10. The image forming apparatus according to claim 7, wherein the cover portion is more separated from the surface of the board than the surface of the electrolytic capacitor on which the explosion-proof valve is provided.

11. The image forming apparatus according to claim 7, wherein the cover portion is closer to the surface of the board than the surface of the electrolytic capacitor on which the explosion-proof valve is provided.

12. The image forming apparatus according to claim 7, wherein the heat sink further includes an inclined portion that is connected to a part of a perimeter of the cover portion and is inwardly inclined with respect to the cover portion.

13. The image forming apparatus according to claim 7, further comprising an exterior cover extending in a perpendicular direction,
wherein the electrolytic capacitor is provided in such an orientation that the exterior cover and the explosion-proof valve of the electrolytic capacitor face each other.

* * * * *